May 20, 1969     C. N. ALBERTO     3,444,934
LAWN WEEDER
Filed April 1, 1966
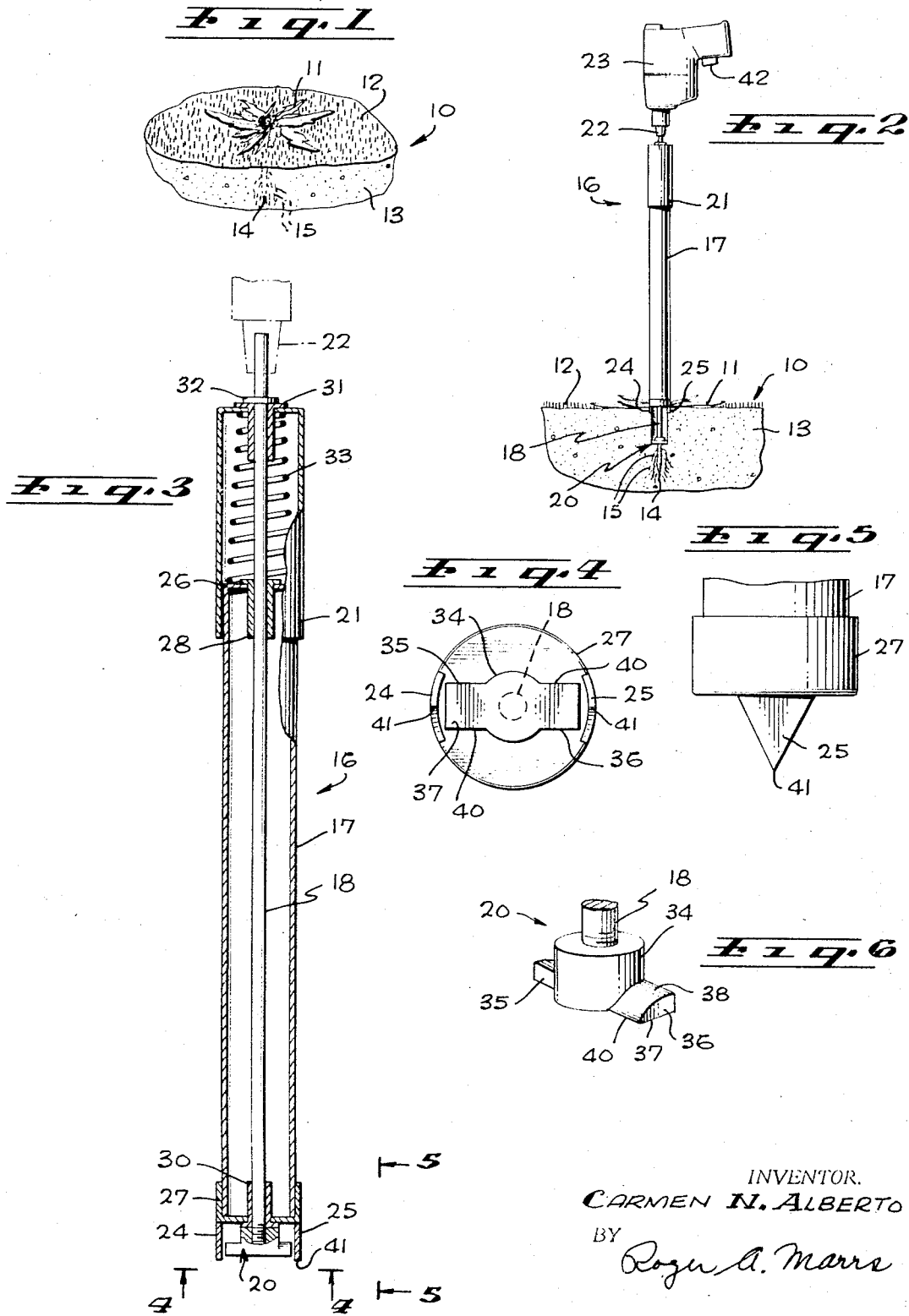
INVENTOR.
CARMEN N. ALBERTO
BY
Roger A. Marrs

United States Patent Office 3,444,934
Patented May 20, 1969

3,444,934
LAWN WEEDER
Carmen N. Alberto, 11202 Forbes Ave.,
Granada Hills, Calif. 91344
Filed Apr. 1, 1966, Ser. No. 539,404
Int. Cl. A01b 33/06; A10b 13/00
U.S. Cl. 172—25      9 Claims

ABSTRACT OF THE DISCLOSURE

This invention relates to weeding devices and more particularly to a novel weeding device effective to destroy or permanently damage a variety of weed and plant growths regardless of root depth, fibrous texture of the root, or extent of the root system.

---

A multiplicity of gardening tools and implements as well as numerous chemical preparations have been employed in the past for deterring, removing or destroying a variety of undesirable weed and plant growths that appear in lawns, gardens or the like. Obviously, the presence of such growths greatly detracts from the appearance of the lawn or garden and most weeds have a detrimental and adverse effect upon surrounding desirable growth.

Many of the undesirable weed and plant growths include elaborate and complex root systems. Other growths incorporate roots of tough and stringy fibrous texture that are difficult to sever or remove from the surrounding earth. Because of these weed characteristics and others, difficulties have been encountered when employing conventional gardening implements that result in continued growth of the weed or else results in greatly enlarged holes caused by the removal of earth in which the weed growth is embedded.

Accordingly, these difficulties and problems are obviated by the novel weeder device of the present invention which provides a rectilinearly moving rotatable shaft incorporating a bladed cutting element that engages and pulverizes the weed growth. Since the shaft moves rectilinearly, the cutting element can be forcibly urged into the earth to any desired depth sufficient to destroy the weed root system. For rotating the shaft and the cutting element, a feature of the invention resides in the employment of a hand held electrical motor power unit which is detachably coupled to the end of the movable shaft opposite to its end carrying the cutting element. By employing power rotation of the shaft, the cutting blade or cutting element may be readily driven through relatively tough and stringy root fibers.

Additionally, means are provided for enclosing and holding the rotatable and rectilinearly moving shaft as well as spring biasing means operating in connection with the casing and the shaft for normally biasing the cutting element in a position immediate to the lower end of the casing so that the cutting element is not projecting outward to the extent that the cutting element will become caught or entangled by clothing or the like. Means are provided on the end of the casing semi-encompassing the cutting element and adapted for engaging the ground surface around a particular weed by which the casing and the weeder is supported.

Therefore, it is a primary object of the present invention to provide a novel lawn and garden weeding device which incorporates a rectilinearly moving and rotatable shaft for carrying a cutting element which is adapted to be forcibly urged into cutting communication with a particular weed growth so as to grind and pulverize the growth including its root system.

Another object of the present invention is to provide a novel weed grinding device which provides a rotatable cutting element which may be moved between the surface of the ground and a short distance thereunder to effect the pulverization of a weed growth including means for powering the rotation of the cutting element to effect thorough grinding and ease of cutting element insertion into the earth.

Still another object of the present invention is to provide a novel weeder having a rotatable cutting blade adapted to be inserted in the ground from a casing including stabilizing means carried on the casing for supporting the weeder against the surface of the ground into which the cutting blade is inserted.

Yet another object of the present invention is to provide a novel weeding apparatus which incorporates a rotatable cutting element adapted to be powered for effecting ready insertion into the ground and further including outwardly extending cutting blades on opposite sides thereof for severing the root system of the weed intended to be destroyed.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is an enlarged perspective view of a section of lawn and illustrating a typical weed growth intended to be destroyed or damaged by the apparatus of the present invention;

FIGURE 2 is a side elevational view of the novel lawn and garden weeder device of the present invention shown in operation for effecting the destruction of the weed growth;

FIGURE 3 is a cross-sectional view of the lawn weeder as shown in FIGURE 1;

FIGURE 4 is an end view of a lawn weeder as taken in the direction of arrow 4—4 of FIGURE 3;

FIGURE 5 is a fragmentary view of the ground engaging portion of the lawn weeder shown in FIGURE 3 as taken in the direction of arrow 5—5 thereof; and FIGURE 6 is a perspective view of the cutting and grinding element incorporated into the lawn weeder for pulverizing the weed growth.

Referring to FIGURE 1, an enlarged portion of a typical lawn is shown in the general direction of arrow 10 wherein a weed 11 is illustrated as having a leaf and flower portion spreading outwardly across the surface of the turf 12 growing from a section of earth 13. The weed 11 is illustrated as having a downwardly extending root 14 including a plurality of small sub-roots 15 commonly known as hair roots. The main root 14 and the hair roots 15 comprise the root system of the plant 11 and are embedded in the earth which holds the plant 11 firmly in situ. In order to destroy the plant 11, it is necessary to separate the entire main root 14 or the major portion thereof from the surrounding earth 13 so that the root system will be rendered incapable of survival. Furthermore, by destroying the leaf and flower portion of the weed 11, the continued growth of the weed will be retarded inasmuch as no portion of the root system will be exposed to sunlight from which the root system can derive nourishment.

Referring now to FIGURE 2, the novel lawn weeder of the present invention is illustrated in the general direction of arrow 16 which is suitable for severing the leaves and flower portion of the weed 11 from the root 14 as well as to destroy a major portion of the root 14 and its root system. In general, the weeder 16 includes an elongated casing 17 which may serve as a handle as well as to mount and support a rectilinear moving and rotatable shaft 18. The shaft 18 has a cutting element 20 fixed on one extremity while the other extremity of the shaft projects exteriorly from a slidable sleeve 21 movably mounted in telescoping relationship on the upper end of casing 17. The exposed end of shaft 18 is adapted to be detachably connected with a chuck 22 mounted on the end of a drive shaft (not shown) suitably driven by an electrical motor unit mounted within a hand grip casing 23. The power motor unit held by housing 23 as well as the drive shaft and chuck 22 may take the form of any suitable or conventional hand actuated power source.

The end of casing 17 opposite to its end carrying sleeve 21 is provided with means comprised of spikes 24 and 25 which are arranged in fixed spaced apart relationship and are adapted to be pressed into the earth 13 to support the casing 17 thereon. The cutting element 20 is disposed between the spaced apart spikes 24 and 25 and the cutting element is adapted to move outwardly from the end of the casing 17 along the major axis thereof from between the spikes 24 and 25 during operation of the device.

Referring now to FIGURE 3, the weeder of the present invention is shown in greater detail wherein the casing 17 is illustrated as having a constant longitudinal cross-section throughout its length wherein one end thereof is closed by means of a plate or disc 26 and having its opposite end closed by means of a cap 27. The disc 26 and cap 27 may be secured to the casing by any suitable means such as welding, soldering, or by any suitable fastener or the like. However, the disc 26 and the cap 27 are provided with coaxial bores lying on the central longitudinal axis of the casing 17 into which are fitted suitable shaft bearings or journals 28 and 30, respectively. These bearings or journals are arranged to support the shaft 18 so as to permit rectilinear movement of shaft 18 through the casing 17 as well as to permit simultaneous rotation of shaft 18.

To further support and maintain alignment of the shaft 18 within the housing 17, the closed end of sleeve 21 is provided with a similar shaft journal or bearing 31 through which the upper end of shaft 18 passes. A collar 32 is attached to the shaft and operates against the shoulder of bearing 31 which the shaft advanced so that the sleeve will telescope over the casing. The cutter 20 is suitably attached to the end of shaft 18 projecting from the journal or bearing 30 by any suitable means such as by the threadable engagement of the cutting element 20 with the shaft end. If desired, a set screw arrangement can be employed to firmly affix the element 20 to the shaft 18.

An expansion helical spring 33 is disposed about the upper end of shaft 18 that is compressed between the disc 26 and the inside of the closure end of sleeve 21. In this fashion, the shaft 18 including the cutting element 20 is biased upwardly within the casing 17 so that the cutting element 20 is normally held against the lower end of casing 17 between the opposing spikes 24 and 25. Preferably, cutting element 20 is provided with a shoulder portion 34 which is of greater diameter than the diameter of shaft 18 so that the shoulder will abut against the mounting flange of the bearing 30 to prevent shaft 18 from retracting into the interior of the casing 17.

Referring now to FIGURE 4, element 20 is illustrated as being adapted to rotate within the space provided between the spikes 24 and 25. Furthermore, the cutting element 20 is shown to comprise a pair of outwardly extending blades 35 and 36 projecting from opposite sides of the central or shoulder portion 34. As more clearly illustrated in FIGURE 6, each blade is provided with a flat bottom surface 37 and a sloping top surface 38 terminating in cooperation with the surface 37 to provide a cutting edge 40. The overall length of the cutting element between the opposite extremities of the cutting blades 35 and 36 is sufficient to insure that a substantial portion of the ground area surrounding a weed or plant root will be subjected to the grinding and pulverizing action of the cutter blade to effect permanent damage or destruction to the weed and root.

With reference to FIGURE 5, the spikes 24 and 25 are illustrated as being of a substantially V-shaped configuration having the base thereof suitably fastened to the cap 27 and downwardly depending therefrom to terminate in a sharp point 41 to insure ready insertion into the ground 13 to stabilize and support the casing 17 during operation.

Actual operation of the present invention will be described with respect to FIGURES 1 and 2 wherein the weeder 16 is placed over the weed 11 in such a manner that the spikes 24 and 25 are disposed on opposite sides of what may be visually determined to be the center of the weed or plant. The casing 17 may be held in one hand while the other hand of the operator may hold the electric motor unit 23. The chuck 22 associated with the motor unit is suitably fastened to the one end of shaft 18 and power may be applied thereto for rotating the shaft by activating a trigger 42. As the shaft 18 rotates within the journals or bearings 28, 30 and 31, the cutting element 20 will rotate so that the cutting blades 35 and 36 chop, cut and grind all portions of the plant and terrain into which it comes into contact. This action is sufficient to sever the leaves of the weed or plant and to expose the upper end of the root 14.

Next, the operator's hand holding the motor unit 23 can be pushed downwardly against the expansion bias of spring 33 so that the sleeve 21 slides over the top portion of the casing 17. This action causes the shaft 18 to move downwardly extending the cutting element 20 away from the end of the casing 17. The forcible urging of the cutting element downward while simultaneously rotating effects further grinding and pulverizing of the plant root including major portions of the root sub-system. The cutting element can be forced to a depth determined by the abutment of the lower portion of bearing 31 with the upper portion of bearing 28.

Once the cutting element 20 has been forced to its maximum depth in the terrain 13, the power to the motor unit 23 can be terminated and the weeder 16 removed from its supporting engagement with the ground. Spring 33 will automatically bias the cutting element 20 rearwardly by retracting the shaft 18 so that the cutting element resides adjacent the end of casing 17 between the spikes 24 and 25. The undesired and unwanted weed or plant is permanently damaged and portions thereof ground or pulverized to the extent that further growth of the plant is either completely avoided or substantially retraded. Furthermore, inasmuch as the leaves of the plant have been severed, no nourishment from sunlight can be provided to the root system which further retards continued growth of the plant.

The weeder 16 may now be placed over other weeds or the like in various areas of the lawn or garden to effect the removal of the unwanted growths. Therefore, it can be seen that the device of the present invention provides a novel device for effecting the removal or retardation of a variety of weeds or plants which conventional devices cannot conveniently achieve.

While particular embodiment of the present invention have been shown and described, it will be obvious to those skilled in the art that changes and modifications may be made without departing from this invention.

I claim:
1. A lawn or garden weeder comprising:
an elongated casing having closures carried on its opposite ends;
a shaft mounted through said casing closures along the central longitudinal axis of said casing and adapted for simultaneous rectilinear and rotary movement therein;
a cutting element fixed on one end of said shaft exteriorly of said casing;
a sleeve slidably carried in telescoping relationship on the end of said casing opposite to its end from which said cutting element extends and having one end of said sleeve secured to said shaft;

a helical spring disposed about said shaft within said sleeve and being compressed between one of said casing closures and the end of said sleeve secured to said shaft to normally bias said cutting element against the other end of said casing;

said closure at the end of said casing adjacent said cutting element is a cap fitted over said casing and wherein the telescoping end of said sleeve encloses the other of said closures; and a power unit detachably coupled to the other end of said shaft for effecting powered rotation of said cutting element whereby an undesired plant growth coming into contact with said cutting element will be chopped and pulverized to effect permanent damage to the plant.

2. The invention as defined in claim 1 wherein said cutting element includes a shoulder portion secured to the end of said shaft and a pair of outwardly projecting blades extending from opposite sides of said shoulder portion.

3. The invention as defined in claim 2 including a pair of ground engaging spikes arranged in fixed spaced relationship with respect to each other about said cutting element when said cutting element is normally biasing against said casing and wherein said spikes are downwardly depending from one of said casing closures.

4. The invention as defined in claim 3 wherein said cutting element blades include a ground engaging surface coextensive between the opposite ends of said blades.

5. The invention as defined in claim 4 wherein said cutting element blades further includes each blade having a cutting edge disposed in the direction of rotation of said cutting element.

6. The invention as defined in claim 5 wherein linear advancement of said shaft from the end of said casing that carries said spikes effects the forcible urging of said cutting element into the ground holding the unwanted plant; and means operable between said sleeve and said casing to limit the advancement of said shaft to determine the depth of said cutting element travel into the ground.

7. The invention as defined in claim 6 including a bearing fixed on each of said closures coaxial with said casing for movably supporting said shaft.

8. A lawn or garden weeder comprising:
an elongated casing having closures carried on its opposite ends;
a shaft mounted through said casing closures along the central longitudinal axis of said casing and adapted for simultaneous rectilinear and rotary movement therein;
a cutting element fixed on one end of said shaft exteriorly of said casing;

a sleeve slidably carried in telescoping and coaxial relationship on the end of said casing opposite to its end from which said cutting element extends and having one end of said sleeve secured to said shaft;

a helical spring coaxially disposed about said shaft within said sleeve and being compressed between one of said casing closures and the end of said sleeve secured to the shaft to normally bias said cutting element against the other end of said casing;

a pair of V-shaped ground engaging spikes arranged in fixed spaced relationship with respect to each other about said cutting element when said cutting element is normally biasing against said casing and wherein said spikes are downwardly depending from opposite sides of a selected one of said casing closures;

said cutting element includes a shoulder portion secured to the end of said shaft and a pair of outwardly projecting blades extending from opposite sides of said shoulder portion and including a ground engaging surface coextensively formed between the opposite ends of said blades;

said closure at the end of said casing adjacent said cutting element is a cap fitted over said casing and wherein the telescoping end of said sleeve encloses the other of said closures; and a power unit detachably coupled to the other end of said shaft for effecting powered rotation of said cutting element whereby an undesired plant growth coming into contact with said cutting element will be chopped and pulverized to effect permanent damage to the plant.

9. The invention as defined in claim 1 wherein said cutting element includes a shoulder portion secured to the end of said shaft and a pair of outwardly projecting blades extending from opposite sides of said shoulder portion having a ground engaging surface coextensive between the opposite ends of said blades and each of said blades having a cutting edge disposed in the direction of rotation of said cutting element leading to an upwardly sloping ramp which terminates at the rear of said blade.

References Cited

UNITED STATES PATENTS

| 2,763,222 | 9/1956 | Herstedt | 172—720 X |
| 2,991,838 | 7/1961 | Lane | 172—111 X |
| 3,136,372 | 6/1964 | Roach | 172—41 |
| 3,210,112 | 10/1965 | Glynn | 172—22 X |

ABRAHAM G. STONE, *Primary Examiner.*

S. C. PELLEGRINO, *Assistant Examiner.*

U.S. Cl. X.R.

172—41, 720